(12) United States Patent
Herthan et al.

(10) Patent No.: US 11,536,073 B2
(45) Date of Patent: Dec. 27, 2022

(54) ADJUSTMENT ASSEMBLY FOR A VEHICLE WITH AN ULTRASONIC SYSTEM AND METHOD FOR OBSTACLE DETECTION

(71) Applicant: Brose Fahrzeugteile SE & Co. Kommanditgesellschaft, Bamberg, Bamberg (DE)

(72) Inventors: Bernd Herthan, Michelau (DE); Manfred Stenzel, Bamberg (DE); Christoph Brückner, Forchheim (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 392 days.

(21) Appl. No.: 16/790,532

(22) Filed: Feb. 13, 2020

(65) Prior Publication Data
US 2020/0263476 A1   Aug. 20, 2020

(30) Foreign Application Priority Data

Feb. 14, 2019   (DE) ..................... 10 2019 103 792.1

(51) Int. Cl.
*E05F 15/42* (2015.01)
*B62D 33/023* (2006.01)
(Continued)

(52) U.S. Cl.
CPC .............. *E05F 15/42* (2015.01); *B60J 5/047* (2013.01); *B60J 10/80* (2016.02);
(Continued)

(58) Field of Classification Search
CPC . E05F 15/42; B60J 10/80; B60J 5/047; B60R 11/0217; B60R 11/0247;
(Continued)

(56) References Cited

U.S. PATENT DOCUMENTS 4,458,446 A * 7/1984 Mochida ................ B60K 28/00
                                                49/31
9,507,023 B2   11/2016 Nakano et al.
(Continued)

FOREIGN PATENT DOCUMENTS

DE    102010031573 A1    1/2012
DE    102014012193 A1 *  2/2016 .............. E05F 15/73
(Continued)

*Primary Examiner* — Lori L Lyjak
(74) *Attorney, Agent, or Firm* — Brooks Kushman, P.C.

(57) ABSTRACT

An adjustment assembly for use in a vehicle, including an adjustable part configured to move between an open position and a closed with respect to a vehicle body. The adjustable part may include an outer side and an inner side. At least a portion of the adjustable part may define an opening extending between the outer side and the inner side. The adjustment assembly may include an ultrasonic transmitter, disposed on either the adjustable part or the vehicle body and may be configured to emit a number of ultrasonic waves to an obstacle, and an ultrasonic receiver disposed on the inner side of the adjustable part and configured to receive the ultrasonic waves reflected from the obstacle through the opening.

20 Claims, 2 Drawing Sheets

(51) Int. Cl.
*B62D 25/08* (2006.01)
*B60J 5/04* (2006.01)
*B60R 11/02* (2006.01)
*B60J 10/80* (2016.01)
*B60R 13/02* (2006.01)
*G01S 15/04* (2006.01)

(52) U.S. Cl.
CPC ...... *B60R 11/0217* (2013.01); *B60R 11/0247* (2013.01); *B60R 13/02* (2013.01); *B62D 25/087* (2013.01); *B62D 33/023* (2013.01); *G01S 15/04* (2013.01); *B60R 2013/0287* (2013.01); *E05Y 2400/44* (2013.01); *E05Y 2900/531* (2013.01)

(58) Field of Classification Search
CPC ............ B60R 13/02; B60R 2013/0287; B62D 25/087; B62D 33/023; G01S 15/04; E05Y 2400/44; E05Y 2900/531
See application file for complete search history.

(56) References Cited

U.S. PATENT DOCUMENTS

| | | | |
|---|---|---|---|
| 2004/0040771 A1* | 3/2004 | Ploucha | .................. E05F 15/43 180/271 |
| 2017/0059697 A1 | 3/2017 | Esmail | |
| 2019/0170872 A1* | 6/2019 | Hirano | .................... G01S 7/521 |

FOREIGN PATENT DOCUMENTS

| | | | | |
|---|---|---|---|---|
| DE | 102014118318 A1 | 6/2016 | | |
| DE | 102017206820 A1 | 11/2017 | | |
| DE | 102018100250 A1 | 7/2019 | | |
| JP | 2018154223 A | * 10/2018 | ................ | B60J 1/17 |
| WO | 2004055661 A1 | 7/2004 | | |
| WO | 2012140769 A1 | 10/2012 | | |

* cited by examiner

ADJUSTMENT ASSEMBLY FOR A VEHICLE WITH AN ULTRASONIC SYSTEM AND METHOD FOR OBSTACLE DETECTION

CROSS-REFERENCE TO RELATED APPLICATIONS

This application claims priority to German Patent Application No. DE 10 2019 103 792.1, filed on Feb. 14, 2020, the disclosure of which is hereby incorporated in its entirety by reference herein.

TECHNICAL FIELD

The present disclosure relates to an adjustment assembly for a vehicle and to a method for detecting an obstacle in an adjustment path of an adjustable part provided on a vehicle.

BACKGROUND

In principle, the proposed solution proceeds from an obstacle detection on the basis of ultrasonic waves. In accordance with the underlying measurement principle it is thus provided that ultrasonic waves are emitted, which are reflected by a potential obstacle in an adjustment path of an adjustable part to be adjusted. From received, reflected ultrasonic waves and determined time differences between emitted and received ultrasonic waves in particular the distance of an object to the adjustable part can then be determined and it can thus be evaluated electronically whether an adjustment of the adjustable part should possibly be omitted (with the adjustable part still at rest) or must be stopped and/or reversed (with the adjustable part currently carrying out an adjusting movement) in order to avoid a collision with the obstacle.

SUMMARY

One or more objects of the present disclosure may be to provide a correspondingly improved adjustment assembly for a vehicle including an ultrasonic system for the detection of an obstacle as well as an improved detection method.

Accordingly, there is proposed an adjustment assembly for a vehicle, which may include an adjustable part to be adjusted, as well as an ultrasonic system for the detection of an obstacle in an adjustment path of the adjustable part. The adjustable part is provided to close a body opening in a completely closed position on the vehicle and to allow its adjustment in the direction of a maximally open position in order to make the body opening accessible. For example, when the adjustable part is adjusted in the direction of the maximally open position, a potential obstacle in the adjustment path of the adjustable part will be detected via the ultrasonic system in order to inhibit a (power-operated or manual) adjustment of the adjustable part or to stop and/or to realize an adjustment taking place already so that the adjustable part does not collide with the obstacle. In the proposed solution, the ultrasonic system includes at least one ultrasonic transmitter for emitting ultrasonic waves and in addition to the at least one ultrasonic transmitter at least one ultrasonic receiver for receiving ultrasonic waves. The ultrasonic receiver is separated from the at least one ultrasonic transmitter and for example spatially slightly spaced apart from the at least one ultrasonic transmitter in order to be able to provide different sound propagation paths for emitted ultrasonic waves on the one hand and received ultrasonic waves on the other hand. Furthermore, the at least one ultrasonic receiver is non-visibly provided in the region of a through opening of the adjustable part, via which an ultrasonic wave emitted by the at least one ultrasonic transmitter and reflected by an obstacle which lies in the adjustment path of the adjustable part may directly reach the ultrasonic receiver without previously coupling into a component of the adjustable part.

One or more embodiments proceed from the basic idea to non-visibly provide the at least one ultrasonic receiver on the adjustable part, but at the same time provide for a direct propagation of reflected ultrasonic waves to the ultrasonic receiver via the at least one through opening. The proposed solution may include the fact that without previously coupling into a trim or sheet metal component of the adjustable part, reflected ultrasonic waves are guided to the at least one ultrasonic receiver via the through opening in the adjustable part, which ultrasonic receiver is arranged behind the trim or sheet metal component so as to be concealed by the corresponding trim or sheet metal component. The ultrasonic system thereby may also be arranged behind elements of the adjustable part defining visible surfaces so as not to be visible from outside, without having to implement complex evaluation algorithms for an effective detection of potential obstacles or having to provide a damping element or even a plurality of damping elements between an ultrasonic receiver and a component of the adjustable part, into which the reflected ultrasonic waves couple (as this is proposed by US 2017/059697 A1). A separation of ultrasonic receiver and ultrasonic transmitter furthermore permits to initially couple an emitted ultrasonic wave into a component of the adjustable part and only then transmit the same to the air, but then the reflected ultrasonic waves may be received by the at least one ultrasonic receiver via the at least one through opening without being disturbed. In this connection it can be provided that the at least one ultrasonic transmitter is arranged not on, but beside the adjustable part, e.g. on an A-, B- or C-pillar of the vehicle or in or around an attachment part, such as a side indicator in the fender of the vehicle.

In one or more embodiments, a direct connection to the ultrasonic receiver is provided via the through opening. Via the through opening, reflected ultrasonic waves thus may propagate directly to the ultrasonic receiver which is not visible on an outer side of the adjustable part.

The through opening may be formed by a cutout formed between two components of the adjustable part mounted on each other, such as by a gap. The corresponding through opening thus is present (anyway) due to its assembly and/or construction and possibly even is absolutely necessary and is used on the at least one ultrasonic receiver for the undisturbed receipt of reflected ultrasonic waves, without providing a separate cutout on the adjustable part, for example in the form of a bore, for instance with a diameter in the range of 0.5-3 mm. For example, in an adjustment assembly comprising a vehicle door or a lid, e.g. a trunk lid, as adjustable part, some smaller or larger openings, such as gaps typically are formed due to the construction with components attached to each other. For example, narrow gaps are regularly provided in the region of a mirror triangle, a trim or a door or trunk handle. A design variant of the proposed solution makes use of this and may position the at least one ultrasonic receiver such that ultrasonic waves reflected via at least one such through opening present anyway may directly get to and be received by the ultrasonic receiver arranged within the door or within the lid so as not to be visible from outside.

Moreover, a gap present due to the construction partially may be slightly broadened, i.e. locally be increased, in order to provide for a propagation of ultrasonic waves therethrough. In principle, a gap may protectively be covered by a membrane (e.g. made of silicone or a coated textile fabric).

In principle, it may be provided for example that the through opening opens into a (waveguide) channel at whose end the at least one ultrasonic receiver is provided. The through opening then for example is provided at a first end of the channel, at whose second end facing away from the through opening the at least one ultrasonic receiver is arranged. In this way, an ultrasonic wave which gets into the channel via the through opening is guided directly to the at least one ultrasonic receiver. A corresponding (waveguide) channel need not be configured so as to extend rectilinearly. For example, to avoid having to arrange an ultrasonic receiver directly behind the through openings on the adjustable part, it may be provided that an ultrasonic wave guided via the channel in the direction of the ultrasonic receiver is reflected once or several times within the channel and thereby is deflected, before the ultrasonic wave reaches the ultrasonic receiver.

To permanently protect the ultrasonic receiver from water and/or dirt and to avoid that the receipt of ultrasonic waves is impaired by water adhering to the ultrasonic receiver or by adhering dirt, a possible development provides that at least one water and/or dirt barrier is provided in the channel. Such a water and/or dirt barrier for example may comprise a membrane and/or a hydrophobic material and/or a fabric, such as a coated fabric. By means of a corresponding water and/or dirt barrier, an air gap present on the adjustable part as a through opening then for example may also effectively be protected from penetrating water and/or dirt when ultrasonic waves reflected thereby are meant to reach an ultrasonic receiver positioned as proposed.

The water and/or dirt barrier for example may be mounted in front of the channel or in front of a gap. The channel or gap thereby is not visible from outside and the channel or the gap cannot get clogged by water or dirt (for example due to applied care or polishing agents) and thus impair the function of the ultrasonic receiver.

In one or more embodiments, the channel which adjoins the through opening is formed on a holder of the adjustment assembly via which the at least one ultrasonic receiver is fixed to the adjustable part. The holder may form a premountable and pre-testable construction unit with the at least one ultrasonic receiver. The ultrasonic receiver then is already arranged on the holder before a fixation of the holder to the adjustable part is affected. In an alternative design variant on the other hand it is provided that the ultrasonic receiver subsequently is mounted to the holder which is already fixed to the adjustable part.

Via the (waveguide) channel formed on the holder it may be ensured that the ultrasonic receiver is disposed at the end of a propagation path defined by the channel for reflected ultrasonic waves not coupled in, without therefor having to arrange the ultrasonic receiver directly behind the through opening—based on a propagation direction of the reflected ultrasonic waves.

The holder for example is fixed to an inner side of a component or a (functional) assembly of the adjustable part. A corresponding component or a corresponding assembly also may include a visible surface which is at least partly visible on an outer side of the adjustable part. Thus, the holder for example is fixed to an inner side of a component which forms a visible part of an outer surface of the adjustable part when the adjustable part has been properly mounted to the vehicle. Correspondingly, such a component for example can be a door outer skin, such as a door outer panel, a vehicle door or a trim component, for example in the form of a trim on a window frame of a vehicle door, on a mirror triangle of a vehicle door or on a door edge of a vehicle door. A (functional) assembly which defines a visible surface on the adjustable part may be provided for example in a vehicle side door by a door handle assembly with a handle trim. In a door handle assembly, at least one gap moreover regularly is provided in the mounted condition due to its construction, which gap may be used as a through opening for reflected ultrasonic waves to be guided to an ultrasonic receiver.

A holder for at least one ultrasonic receiver for example may cohesively, positively or non-positively be fixed to the corresponding component of the adjustable part. For example, the corresponding holder is glued, screwed and/or clipped. For example, the holder is fixed to a door body component, an inner side of a door outer skin, a trim or a door handle, so that reflected ultrasonic waves may be received by such an ultrasonic receiver, which ultrasonic waves originate from an object that is disposed in an adjustment path of a (lateral or rear-side) vehicle door to be opened or of a trunk lid to be opened.

As one example, with a view to a design variant in which the adjustable part to be adjusted is formed by a vehicle door or a lid, such as a trunk lid, it may be provided that via the through opening ultrasonic waves sent by the at least one ultrasonic transmitter and reflected by an obstacle may get directly to the ultrasonic receiver without previously being coupled into a trim component or a sheet metal component of the adjustable part. This includes for example, the fact that the at least one ultrasonic receiver is fixed to or beside the trim component or the sheet metal component, but ultrasonic waves reflected through the through opening may directly get to the ultrasonic receiver without previously coupling into the respective component. An ultrasonic receiver arranged beside the trim component then for example is arranged on a directly adjacent other component of the adjustable part, which is separated from the trim component at least by the through opening. Thus, the at least one ultrasonic receiver may be arranged for example behind or beside a gap between two components of the adjustable part and unimpededly receive reflected ultrasonic waves across the corresponding gap.

For example, the through opening is specified in or beside an outer panel, a mirror triangle, a door handle or a trim component, such as a trim component for a window frame, a trim component for a window parapet or a trim component for a door edge. Correspondingly, the at least one ultrasonic receiver may be fixed for example to a trim, a seal, a bearing bracket, a lock, a door handle or a mirror of a vehicle door. The same applies in principle for the at least one ultrasonic transmitter. As one example, the at least one ultrasonic transmitter may be arranged in spatial proximity to the at least one ultrasonic receiver. Alternatively, however, an arrangement of the at least one ultrasonic transmitter at a larger distance from the at least one ultrasonic receiver also is possible. While a larger proximity between ultrasonic transmitter and ultrasonic receiver facilitates an arrangement in an ultrasonic module, which may be mounted to the respective adjustable part as a construction unit, a spatially more separated arrangement provides for a larger freedom of choice for mounting the ultrasonic transmitter on the one hand and the ultrasonic receiver on the other hand.

For emitting ultrasonic waves, the at least one ultrasonic transmitter may comprise at least one foil with piezoelectric properties, at least one loudspeaker, such as a loudspeaker formed with a microelectromechanical system, or at least one transducer. A microelectromechanical system here is understood to be a so-called microsystem, in the English technical terminology abbreviated as MEMS.

Alternatively or in addition, the at least one ultrasonic receiver for receiving ultrasonic waves may comprise at least one foil with piezoelectric properties, at least one microphone, such as a microphone formed with a microelectromechanical system, or at least one transducer.

In a design variant, a plurality of ultrasonic receivers and/or a plurality of ultrasonic transmitters are provided on the adjustable part. By providing a plurality of ultrasonic transmitters, an adjustment range through which the adjustable part is moved on opening or closing may be monitored more strongly by means of ultrasonic waves and hence may be "illuminated" more strongly so that a detection range is increased. Only by using a plurality of ultrasonic receivers, the position and/or size of an object in turn may be determined or may be determined better. For example, this includes the fact that it may be determined whether a detected object actually has a size due to which a collision with the adjustable part to be adjusted may occur. An exact determination of the position likewise is possible, and hence not only a detection whether an obstacle is present (anywhere) in the adjustment path.

Correspondingly, a design variant for example provides at least three ultrasonic receivers and an electronic evaluation device, wherein the electronic evaluation device is configured to determine a position of an object in an environment around the adjustable part from (ultrasonic measurement) signals which are generated via the at least three ultrasonic receivers on receipt of ultrasonic waves—at these at least three ultrasonic receivers—, by means of a trilateration. The electronic evaluation device here consequently is configured with an evaluation logic for implementing a stored trilateration algorithm which determines a position of an object from signals of at least three ultrasonic receivers spaced apart from each other, which originate from ultrasonic waves reflected by this object.

As one example, in this design variant it can also be provided that via at least one through opening all ultrasonic receivers each receive uninfluenced, reflected ultrasonic waves directly and hence without coupling into a component of the adjustable part. In this way, a three-dimensional object recognition can be implemented with a comparatively high sampling rate, in that all three ultrasonic receivers receive an echo in the form of reflected ultrasonic waves from an object.

Another aspect of one or more embodiments relates to a method for detecting an obstacle in an adjustment path of an adjustable part provided on a vehicle.

By analogy with a proposed adjustment assembly, the following steps may be provided in connection with a proposed detection method:

emitting ultrasonic waves via at least one ultrasonic transmitter at the adjustable part, and receiving ultrasonic waves via at least one separate ultrasonic receiver which is non-visibly provided on the adjustable part in addition to the at least one ultrasonic transmitter.

The ultrasonic waves received at the at least one ultrasonic receiver for the detection of the obstacle here have been emitted by the at least one ultrasonic transmitter and have been reflected at the obstacle and have propagated directly to the ultrasonic receiver through a through opening on the adjustable part without previously coupling into a component of the adjustable part.

A proposed detection method here may be implemented by means of a design variant of a proposed adjustment assembly. Correspondingly, advantages and features explained above and below for an adjustment assembly also apply for design variants of a proposed detection method, and vice versa.

As one example, a corresponding detection method can be implemented in connection with a (lateral or rear-side) vehicle door as an adjustable part.

Furthermore, an implementation with at least three ultrasonic receivers is possible in order to three-dimensionally determine the position of an object by means of a trilateration and hence to evaluate more specifically whether the corresponding object actually constitutes an obstacle for the adjustable part to be adjusted.

BRIEF DESCRIPTION OF THE DRAWINGS

The attached Figures by way of example illustrate possible design variants of the proposed solution.

In the drawings.

DETAILED DESCRIPTION

Figure 1B:
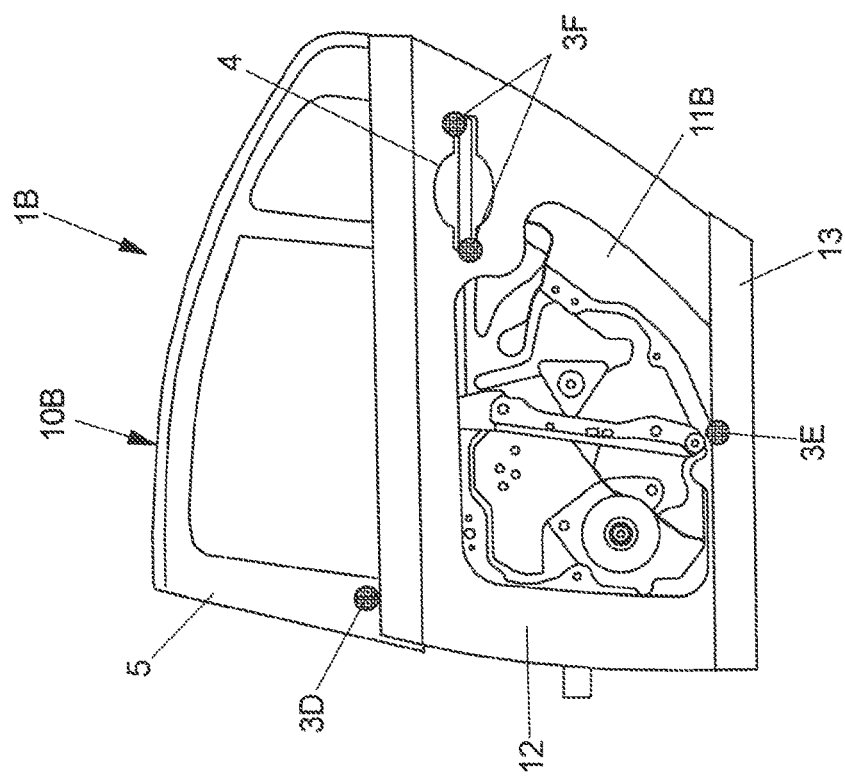
FIGS. 1A-1B by way of example show a side view of a front and a rear side door for a motor vehicle by illustrating different positions for the ultrasonic transmitter and the ultrasonic receiver according to the proposed solution.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Ultrasound-based systems for the detection of an obstacle are widely known in the vehicle sector. It is known for example to use ultrasonic sensors, i.e. combinations of at least one ultrasonic transmitter and one ultrasonic receiver, in a bumper of a vehicle, in order to determine the distance to potential obstacles when parking the vehicle. In most cases, however, an exact determination of the position of an object or a potential obstacle does not take place. What is regularly determined and indicated here only is a radius around the respective sensor on which the detected object is disposed.

Furthermore, in known ultrasonic sensors and ultrasonic systems provided therewith the ultrasonic transmitters and ultrasonic receivers regularly are visibly formed on the adjustable part. For example, corresponding ultrasonic transmitters and ultrasonic receivers are inserted into cutouts or depressions of a bumper manufactured for the sensor system and extend up to an edge of the respective cutout or depression. At best, such sensors on a bumper are painted in the vehicle color. The sensors, however, always remain visible from outside.

From US 2017/059697 A1 for example the integration of an ultrasonic system on an adjustable part in the form of a vehicle side door is known, which is not visible for a user from outside. A transducer comprising an electronic evaluation device is provided behind the door outer panel so as not to be visible from an outer side of a door outer panel. The transducer emits ultrasonic waves and can subsequently receive ultrasonic waves reflected on an object so that from the time differences between the received echoes in the form of reflected ultrasonic waves a distance to a potential obstacle, on which the ultrasonic waves are reflected, can be calculated via the electronic evaluation device.

However, when the transducer should not be visible from an outer side and therefor is provided on the inner side of the door outer panel, the problem arises that the transducer couples its generated ultrasonic waves into the door outer panel and hence into a component of the adjustable part to be adjusted, i.e. the vehicle door. It is only from the door outer panel that generated ultrasonic waves then are transmitted into the air. Conversely, ultrasonic waves reflected by an object which is located in a sensor area of the ultrasonic system again impinge on the door outer panel. Thus, reflected ultrasonic waves first couple into the door outer panel, before they can be received at the transducer. In objects which are located at a small distance to the adjustable part in the form of the vehicle side door, the sound propagation times are comparatively short so that the door outer panel into which the ultrasonic waves couple still vibrates due to an emitted ultrasonic wave when a reflected ultrasonic wave impinges thereon. To distinguish a residual vibration caused by emitted ultrasonic waves from a received echo, however, is not trivial and can render the detection of an obstacle much more difficult.

Against this background, it is proposed in US 2017/059697 A1 to provide additional damping elements on the door outer panel in order to attenuate vibrations of the door outer panel. However, both the emission and the receipt of the ultrasonic waves and hence the generation of a valid measurement signal thereby is made more difficult. The additionally mounted damping elements reduce the energy transfer both from the transducer into the door outer panel and from the door outer panel to the transducer. This leads to a reduced sensitivity of the ultrasonic system so that smaller objects no longer can easily be detected. The distance resolution also is reduced.

Figure 1A:
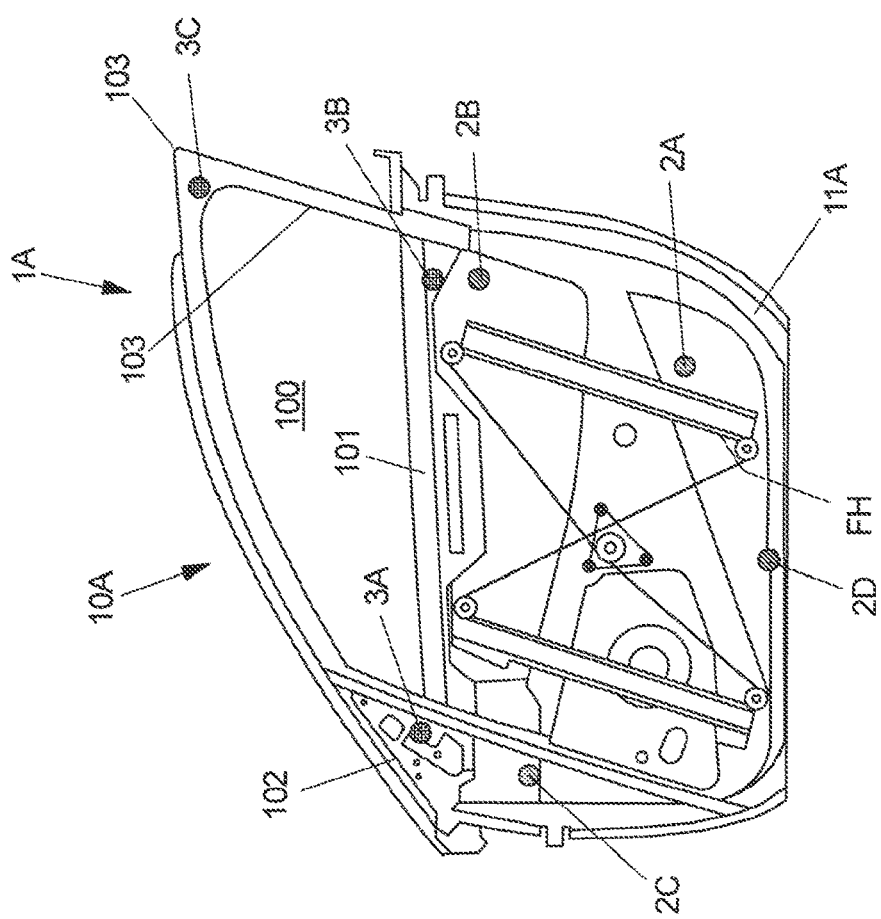

FIG. 1A shows a side view of a front side door 1A of a design variant of a proposed adjustment assembly, in which an adjustment path of the front side door 1A—in the case of a manual and/or power-operated, i.e. motorized adjustment—is monitored for a potential obstacle. For example, when an obstacle is detected in the adjustment path of the opening side door 1A, an adjustment of the side door 1A is inhibited or stopped and possibly reversed in order to avoid a collision with the obstacle.

In the present case an ultrasonic (sensor) system is provided, in which via at least one ultrasonic transmitter ultrasonic waves are emitted into the adjustment range to be monitored. Ultrasonic waves reflected by a potential obstacle are received by at least one ultrasonic receiver so that via an electronic evaluation device coupled with the ultrasonic transmitter and the ultrasonic receiver it can be evaluated for example whether a collision with an obstacle is imminent on opening of the side door 1A. The side door 1A of FIG. 1A here is shown without a door outer skin, which is formed by a door outer panel. In the present case, an ultrasonic (sensor) system for monitoring the adjustment path is arranged behind such a door outer skin so as not to be visible from outside.

In the example of the side door of FIG. 1A, a plurality of positions for the ultrasonic transmitters 2A to 2D of a corresponding ultrasonic system are illustrated. The individual ultrasonic transmitters 2A to 2D can be provided on an inner side of the non-illustrated door outer skin and in this way for example can couple emitted ultrasonic waves into this door outer panel. From the door outer panel the ultrasonic waves then are transmitted into the air into the adjustment range to be monitored. Alternatively, the corresponding ultrasonic transmitters 2A to 2D each can also be provided on a door module 11A of the side door 1A, which for example carries components of a window lifter assembly FH, such as for example guide rails and/or a drive motor for a window pane to be adjusted by means of a motor. As parts of the ultrasonic system only one of the ultrasonic transmitters 2A to 2D or a plurality (at least two) of the ultrasonic transmitters 2A to 2D can also be provided in a side door 1A of FIG. 1A.

Spatially apart and hence separated from an ultrasonic transmitter 2A to 2D one or more ultrasonic receivers 3A to 3C are provided on the side door 1A. An ultrasonic receiver 3A here is provided for example on a mirror triangle 103 of the side door 1A. Another ultrasonic receiver 3B is provided for example in the region of a window parapet 101 of the side door 1A below a window opening 100 of the side door 1A rimmed by a window pane frame 10A. Alternatively or in addition, an ultrasonic receiver 3C is provided in the region of a lateral frame part 103 of the window pane frame 10A. The illustrated positions for the ultrasonic receivers 3A to 3C have in common that with a properly mounted side door 1A a through opening in the form of a gap is present at the respective points, through which gap reflected ultrasonic waves can get directly to the respective ultrasonic receiver 3A to 3C. An ultrasonic receiver 3A, 3B or 3C thus is arranged on a carrier element defining the door structure, such as for example on the window pane frame 10A, or on a component defining an outer visible surface of the side door 1A, such as for example a door outer skin or a trim for the window pane frame 10A.

The arrangement here is such that an ultrasonic wave reflected by an object in the environment of the side door 1A is guided to the respective ultrasonic receiver 3A, 3B and/or 3C via a gap or an opening present anyway, without the corresponding reflected ultrasonic waves initially coupling into an external component of the side door 1A and reaching the respective ultrasonic receiver 3A, 3B or 3C only thereafter. In this connection it also is irrelevant whether ultrasonic waves of one or more ultrasonic transmitters 2A to 2D, which are possibly transmitted via the door outer panel, lead to the fact that the door outer panel still vibrates when ultrasonic waves reflected already must be measured. As the reflected ultrasonic waves impinge on the respective ultrasonic receiver 3A, 3B and/or 3C without coupling into the door outer panel, a residual vibration of the door outer panel is uncritical and need not be distinguished from a received echo in the form of a reflected ultrasonic wave. Thus, an ultrasonic transmitter for example can be mounted on the inner side of the door outer panel as a piezoelectric element, and possibly by means of a coupling material, while for at least one ultrasonic receiver 3A, 3B or 3C of the front side door 1A of FIG. 1A a position in the region of a gap present anyway is chosen.

Moreover, by providing at least three ultrasonic receivers 3A, 3B and 3C a trilateration on the basis of the received ultrasonic waves can also be carried out in order to detect the position in space and/or the size of a potential object in the environment of the side door 1A. Correspondingly, it can also be evaluated, for example, whether a detected object actually protrudes beyond a lower edge of the side door 1A to be adjusted. When this is not the case, the object does not constitute a potential obstacle and the side door 1A can be adjusted across the corresponding object.

As a possible further design variant, FIG. 1B illustrates a rear side door 1B in which by analogy with the design variant of the front side door 1A of FIG. 1A at least one ultrasonic transmitter 2A to 2D is provided on a door outer skin 12, for example in the form of a door outer panel. Here as well, a plurality of positions are illustrated for ultrasonic receivers 3D to 3F, at which ultrasonic waves reflected via a gap present anyway can be guided to the respective ultrasonic receiver 3D-3F without coupling in. For example, an ultrasonic receiver 3D is provided on an outer trim 5 for a window pane frame 10B of the rear side door 1B. An ultrasonic receiver 3E is provided in the region of a trim component 13 at a lower door edge of the rear side door 1B. Especially this ultrasonic receiver 3D can also be mounted on a door module 11B of the rear side door 1B. Furthermore, two ultrasonic receivers 3F by way of example are provided on a door handle 4 of the rear side door 1B. Due to the construction, gaps are present in the region of a handle trim of the door handle 4 just like in the region of the separately mounted outer trim 5 or the trim component 13. Thus, the rear side door 1B of FIG. 1B also makes use of the fact that due to its construction openings or gaps are present at the side door 1B, via which ultrasonic waves reflected by an object in the environment of the side door 1B can get to a correspondingly positioned ultrasonic receiver 3D, 3E and/ or 3F without coupling into the door outer skin 12.

When several ultrasonic transmitters 2A to 2D are spaced apart from each other, possibly combined in a prefabricated ultrasonic module, the ultrasonic transmitters 2A to 2D may each be arranged so that a distance between the ultrasonic transmitters corresponds to a multiple or a fraction of the wavelength of the generated ultrasonic waves. The direction of the emitted ultrasonic waves may be determined by actuation of the ultrasonic transmitters 2A to 2D in the manner of a phase-controlled field ("phased array").

Figure 2:
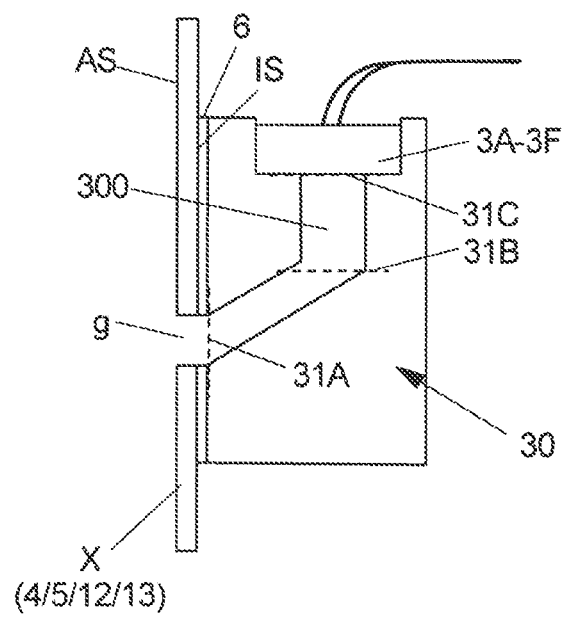
FIG. 2 shows a cutaway side view of the arrangement of an ultrasonic receiver corresponding to the proposed solution on a holder with a waveguide channel.

FIG. 2 illustrates a sectional view of a possible design variant for mounting a corresponding ultrasonic receiver 3A to 3F as shown in FIGS. 1A and 1B. There is schematically illustrated a component X of the side door 1A or 1B, which for example can be the door handle 4, the outer trim 5, the door outer skin 12 or the trim component 13. The respective component X includes an outer side AS facing an exterior space—with the side door 1A or 1B properly mounted on a vehicle—and an inner side IS facing away from the outer side AS. Due to the construction, a gap g is present in the region of the component X. A holder 30 bridging this gap g is mounted to the inner side IS of the component X via a fixation 6. This holder 30 carries one of the ultrasonic receivers 3A to 3F. Via the holder 30, here in the form of a holding bracket, the respective ultrasonic receiver 3A-3F thus is fixed to an inner side IS of the component X.

The holder 30 forms a waveguide channel 300. A first (inlet) end of this waveguide channel 300 directly adjoins the gap g. At a second (outlet) end of the waveguide channel 300 the ultrasonic receiver 3A-3F is arranged. Proceeding from the gap g, the waveguide channel 300 thus extends in the direction of the ultrasonic receiver 3A-3F attached to the holder 30 so that a reflected ultrasonic wave entering the waveguide channel 300 via the gap g is guided directly to the ultrasonic receiver 3A to 3F without the ultrasonic wave having to couple into the component X for this purpose.

In the present case, the waveguide channel 300 is angled at least once so that the ultrasonic receiver 3A-3F need not be arranged directly behind the gap g. Via the holder 3, the ultrasonic receiver 3A-3F rather is positioned offset from and hence beside the gap g in a space behind the respective component X, e.g. behind the door outer skin 12. Via the waveguide channel 300, reflected ultrasonic waves nevertheless get directly to the ultrasonic receiver 3A-3F without being disturbed.

Via the signal line shown in FIG. 2, the ultrasonic receiver 3A to 3F moreover is supplied with electricity. Measurement signals generated by the ultrasonic waves received likewise are transmitted to an electronic evaluation device via these signal lines.

In the design variant of FIG. 2, a plurality of water/dirt barriers 31A, 31B and 31C are sketched in the waveguide channel 300 of the holder 30 in order to prevent that the receipt of ultrasonic waves is disturbed by water and/or dirt. At least one corresponding water/dirt barrier for example can comprise a membrane, a hydrophobic and/or coated material, such as a fabric. In FIG. 2, three possible positions are provided for a corresponding water/dirt barrier 31A, 31B and 31C. At each, several or also at exactly only one of the illustrated positions a water/dirt barrier 31A, 31B or 31C can be provided. A water/dirt barrier 31A for example is provided at the inlet end of the waveguide channel 300 directly behind the gap g. Another or a further water/dirt barrier 31B for example is provided approximately centrally within the waveguide channel 300. Another or a further water/dirt barrier 31C for example is provided at the outlet end of the waveguide channel 300 and hence adjacent to the ultrasonic receiver 3A to 3F.

Contrary to the positions for the ultrasonic transmitter 2A to 2D as explained in connection with FIGS. 1A and 1B, an ultrasonic transmitter of the proposed ultrasonic system can also be provided in the region of a gap g or another through opening, although this is not absolutely necessary. In addition, an ultrasonic transmitter and one or more ultrasonic receivers can also be disposed in greater spatial proximity to each other and may be arranged on a common printed circuit board. The latter possibility is illustrated with reference to an ultrasonic module M of FIG. 3.

Figure 3:
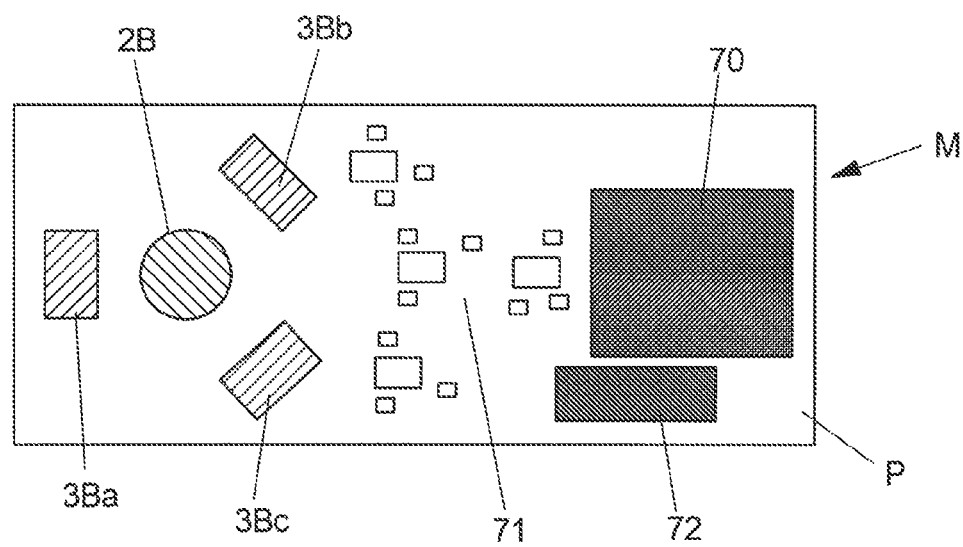
FIG. 3 shows a top view of an ultrasonic module with a printed circuit board on which an ultrasonic transmitter and spatially separated therefrom three ultrasonic receivers are provided together with an electronic evaluation device.

The ultrasonic module M of FIG. 3 includes a printed circuit board P on which an ultrasonic transmitter 2B and three ultrasonic receivers 3Ba, 3Bb and 3Bc surrounding this ultrasonic transmitter 2B are arranged. Via the three ultrasonic receivers 3Ba, 3Bb and 3Bc a trilateration for example may be possible with reference to the ultrasonic waves emitted by the ultrasonic transmitter 2B and ultrasonic waves reflected by an object. A necessary electronic evaluation device likewise is provided on the printed circuit board P and for example consists of a microcontroller 70 and an electronic evaluation unit 71 for the evaluation of measurement signals generated by the ultrasonic receivers 3Ba, 3Bb and 3Bc.

For receiving and transmitting possible control signals, the ultrasonic module M furthermore includes a LIN-bus electronic unit 72 on the printed circuit board P. Via this LIN-bus electronic unit 72 an interface to a LIN bus is provided in order to for example electronically inhibit or stop and possibly reverse an adjustment of the respective side door 1A or 1B when a potential obstacle in the adjustment path of the side door 1A and 1B to be adjusted is inferred via the electronic evaluation device 70, 71 with reference to the received ultrasonic waves.

In principle, an ultrasonic transmitter 2A to 2D can be a foil with piezoelectric properties or a loudspeaker, such as a loudspeaker formed by a microelectromechanical system, and an ultrasonic receiver 3A to 3F, 3Ba, 3Bb or 3Bc can be a foil with piezoelectric properties or a microphone, such as a microphone formed by a microelectromechanical system.

When providing three ultrasonic receivers and a proposed arrangement of these ultrasonic receivers such that reflected ultrasonic waves can be received via (already present) through openings and hence without coupling in, the proposed solution may also permit a three-dimensional detection of objects and hence potential obstacles in an area close to the respective adjustable part, for example a front or rear side door 1A or 1B. A corresponding detection also is easily possible in a stationary vehicle and with a comparatively high accuracy and low error rate.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1A, 1B (front/rear) side door
10A, 10B window pane frame
100 window opening
101 window parapet
102 mirror triangle
103 lateral frame part
11A, 11B door module
12 door outer skin
13 trim component
2A-2D ultrasonic transmitter
3A-3F, 3Ba, 3Bb, 3Bc ultrasonic receiver
30 holder
300 waveguide channel
31A-31C water/dirt barrier
4 door handle
5 outer trim
6 fixation
70 microcontroller
71 electronic evaluation unit
72 LIN-bus electronic unit
AS outer side
FH window lifter assembly
g gap/through opening
IS inner side
M ultrasonic module
P printed circuit board While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjustment assembly for use in a vehicle, the adjustment assembly comprising:
    an adjustable part configured to be adjusted along an adjustment path between a completely closed position and a maximally open position wherein when the adjustable part is in the completely closed position, the adjustable part closes a body opening and when the adjustable part is in the maximally open position with respect to the vehicle the body opening is accessible; and
    an ultrasonic system configured to detect an obstacle in the adjustment path and including,
        at least one ultrasonic transmitter configured to emit ultrasonic waves,
        at least one ultrasonic receiver non-visibly provided in a region of a through opening defined by the adjustable part, wherein the at least one ultrasonic receiver is configured to directly receive an ultrasonic wave, emitted by the at least one ultrasonic transmitter and reflected by an obstacle disposed in the adjustment path of the adjustable part, without previously coupling into a component of the adjustable part.

2. The adjustment assembly of claim 1, wherein an indirect connection to the ultrasonic receiver is provided via the through opening.

3. The adjustment assembly of claim 1, wherein the through opening is formed by a gap between first and second components of the adjustable part mounted to each other.

4. The adjustment assembly of claim 1, wherein the through opening opens into a channel, wherein the at least one ultrasonic receiver is provided at an end of the channel.

5. The adjustment assembly of claim 4, further comprising at least one water and/or dirt barrier disposed in the channel.

6. The adjustment assembly of claim 5, wherein the at least one water and/or dirt barrier comprises a membrane and/or a hydrophobic material and/or a fabric.

7. The adjustment assembly of claim 4, further comprising a holder fixed to the adjustable part, wherein the holder defines the channel and wherein the at least one ultrasonic receiver is fixed to the adjustable part by the holder.

8. The adjustment assembly of claim 7, wherein the holder is fixed to an inner side of a component of the adjustable part or an assembly of the adjustable part, wherein the component or the assembly each include a visible surface at least partly visible on an outer side of the adjustable part.

9. The adjustment assembly of claim 1, wherein the ultrasonic waves sent by the at least one ultrasonic transmitter are received directly by the ultrasonic receiver without previously coupling into a trim component or a sheet metal component of the adjustable part.

10. The adjustment assembly of claim 9, wherein the at least one ultrasonic receiver is fixed to or beside the trim component or the sheet-metal component.

11. The adjustment assembly of claim 1, wherein the adjustable part is a vehicle door.

12. The adjustment assembly of claim 11, wherein the through opening is formed by a cutout, a gap, or an opening, the through opening defined by an outer panel or positioned besides an outer panel, or defined by a mirror triangle, or defined by a door handle, or defined by a trim component.

13. The adjustment assembly of claim 1, wherein the at least one ultrasonic transmitter comprises at least one foil having piezoelectric properties, at least one loudspeaker provided with a microelectromechanical system, or at least one transducer each configured to emit a number of ultrasonic waves.

14. The adjustment assembly of claim 13, wherein the at least one ultrasonic receiver comprises at least one second foil provided with piezoelectric properties, at least one microphone provided with a microelectromechanical system, or at least one transducer.

15. The adjustment assembly of claim 1, further comprising, an electronic evaluation device, wherein the at least one ultrasonic receiver includes a first ultrasonic receiver, a second ultrasonic receiver, and a third ultrasonic receiver, wherein the electronic evaluation device is configured to receive signals generated from the first ultrasonic receiver, the second ultrasonic receiver, and the third ultrasonic receiver and determine a position of another object in an environment around the adjustable part by trilateration of the signals.

16. A method of detecting an obstacle in an adjustment path of an adjustable part provided on a vehicle and configured to be adjusted along an adjustment path between a completely closed position and a maximally open position wherein when the adjustable part is in the completely closed position, the adjustable part closes a body opening and when the adjustable part is in a maximally open position with respect to the vehicle the body opening is accessible, the method comprising:

emitting ultrasonic waves via at least one ultrasonic transmitter disposed on the adjustable part; and receiving the ultrasonic waves via at least one ultrasonic receiver non-visibly provided on the adjustable part, wherein the ultrasonic waves are reflected from the obstacle and propagate directly to the ultrasonic receiver through a through opening defined by the adjustable part without previously coupling into a component of the adjustable part.

17. The adjustment assembly of claim 6, wherein the at least one water and/or dirt barrier is formed by a coated fabric.

18. The adjustment assembly of claim 12, wherein the trim component is a window frame trim component, or a window parapet trim component, or a door edge trim component.

19. An adjustment assembly for use in a vehicle, the adjustment assembly comprising:

an adjustable part configured to move between an open position and a closed position with respect to a vehicle body, wherein the adjustable part includes an outer side and an inner side, and wherein at least a portion of the adjustable part defines an opening extending between the outer side and the inner side;

an ultrasonic transmitter disposed on either the adjustable part or the vehicle body and configured to emit a number of ultrasonic waves to an obstacle; and an ultrasonic receiver disposed on the inner side of the adjustable part and configured to receive the ultrasonic waves reflected from the obstacle through the opening.

20. The adjustment assembly of claim 19, further comprising a holder fixed to the inner side of the adjustable part and defining a waveguide channel, wherein the ultrasonic receiver is received by the holder and wherein the waveguide channel extends between the opening and the ultrasonic receiver.

* * * * *